United States Patent Office 3,825,614
Patented July 23, 1974

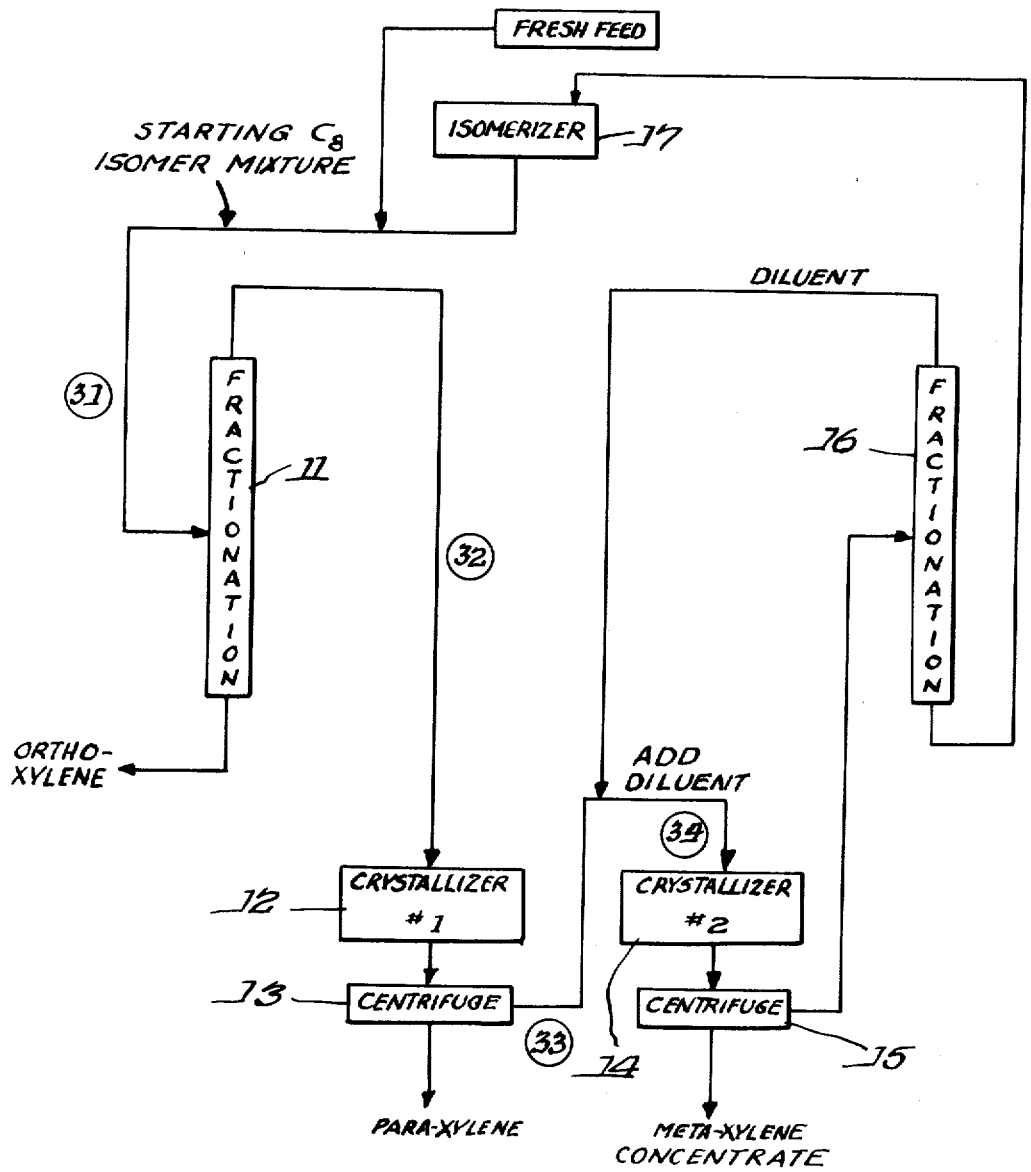

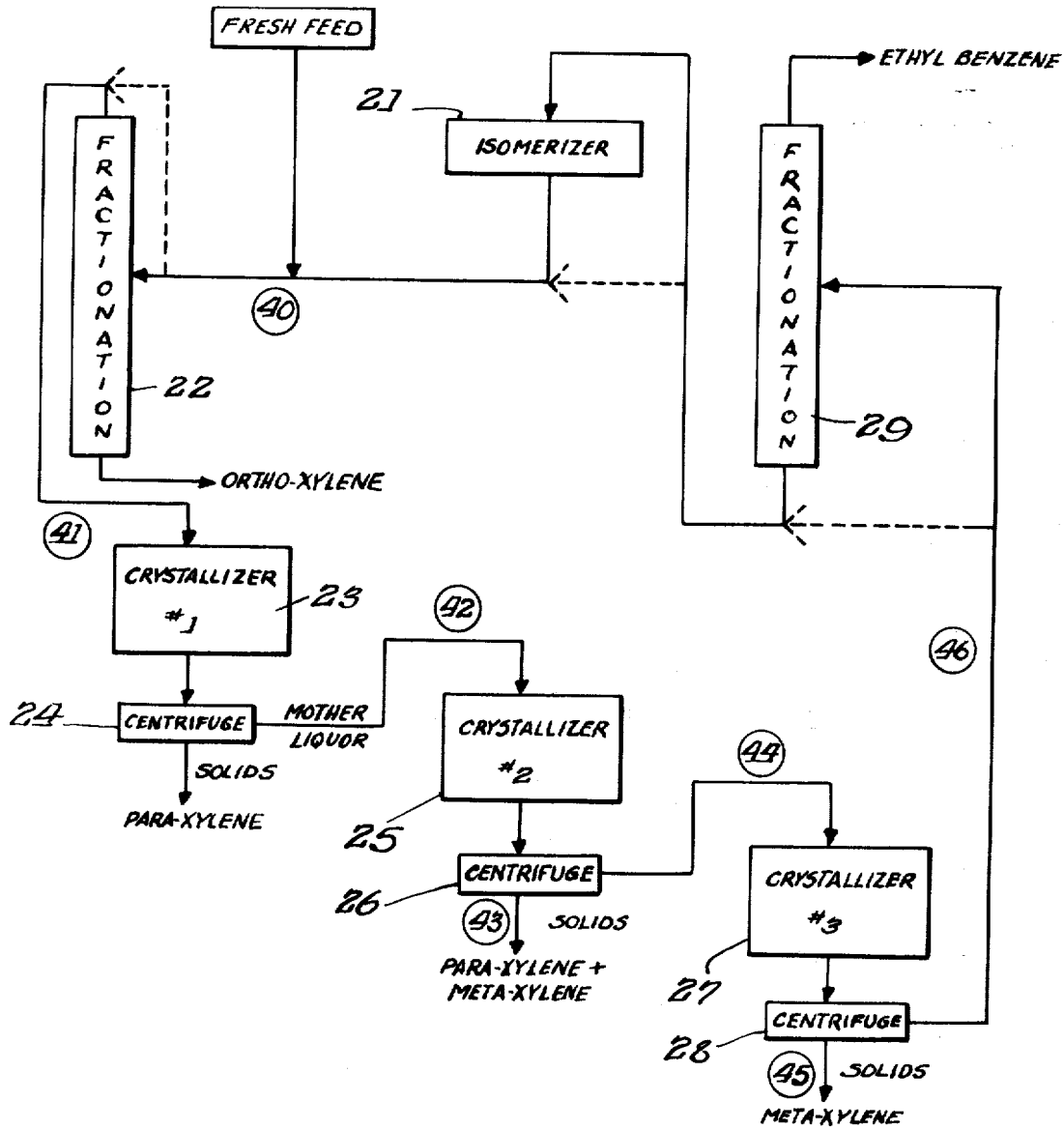

3,825,614
RECOVERY OF META-XYLENE BY SELECTIVE CRYSTALLIZATION
Alan G. Bemis, John K. Darin, and Melvern C. Hoff, Naperville, Ill., assignors to Standard Oil Company, Chicago, Ill.
Filed Aug. 11, 1972, Ser. No. 279,854
Int. Cl. C07c 7/14
U.S. Cl. 260—674 A       22 Claims

ABSTRACT OF THE DISCLOSURE

A process is provided for selectively separating meta-xylene from a mixture of $C_8$ isomers by establishing a unique set of process conditions in which para-xylene is crystallized at an unexpectedly low rate relative to the rate at which metaxylene is crystallized. By preparing a mixture of $C_8$ isomers containing: (1) a substantially eutectic mixture of meta- and para-xylene, (2) an adjusted ortho-xylene concentration to a level below the eutectic ratio of ortho- and meta-xylene, and (3) an adjusted para-xylene concentration of about 10 mole percent or less para-xylene in the mixture, and by cooling this mixture at a temperature and for a time sufficiently short to provide a slurry of crystals enriched in meta-xylene relative to the ratio of meta- and para-xylene normally obtained in crystallization to thermodynamic equilibrium, the recovery of high purity meta-xylene can be effected.

Background of the Invention

This invention relates generally to a process for separating compounds with low boiling point differentials, and more particularly to a process for selectively separating meta-xylene, para-xylene and related $C_8$ aromatics. Even more specifically, however, this invention is concerned with a process for preparing purified meta-xylene of 95 percent purity, and through recrystallization or partial melting preferably 99 percent purity, by creating kinetic-controlled separating conditions that suppress the rate of para-xylene crystallization relative to the rate of meta-xylene crystallization.

In recently years an increased need has developed for meta-xylene rich feed stocks to be used, for example, in making isophthalic acid and related products. On the one hand, little difficulty has occurred in effecting the separation of ethylbenzene and ortho-xylene from $C_8$ mixtures by fractionation, primarily because of the relatively large boiling point differences between those $C_8$ components and related $C_8$ components. On the other hand, great difficulty has been experienced in effectively separating meta-xylene and para-xylene by fractionation because of the small 0.8° C. boiling point difference which exists between the components.

As a consequence, a variety of crystallization techniques have been attempted to separate meta-xylene from para-xylene, but none has proved commercially successful in selectively producing high concentrations of meta-xylene. One major difficulty arises because nearly all these crystallization processes require that at least one isomer be maintained in a metastable state. Under such conditions, of course, any formation of a seed crystal causes an immediate and extensive crystallization of the unwanted isomer and, thus, no useful concentration of either meta-xylene or para-xylene can be effected.

Most commercial para-xylene crystallization processes, for example, produce meta-xylene rich reject filtrate streams (after para-xylene recovery has been accomplished) which contain as much as 8 to 13 percent para-xylene. Previous efforts to crystallize such mixtures to obtain high purity meta-xylene, have resulted in the formation of mixtures of para- and meta-xylene crystals, which at best provide an unsatisfactory resultant equilibrium composition having about 88 percent meta-xylene and 12 percent para-xylene.

As a result, a variety of rather complex and expensive schemes have been proposed to overcome these difficulties and obtain high purity meta-xylene, including sulfonation, adductive crystallization, clathration and adsorption. In most cases, for example, a third component must be introduced into the separation system, which, in turn, requires additional equipment for the subsequent separation and recovery of this third component. In the case of meta-xylene separation by selective sulfonation, considerable equipment is required merely to recover and reconcentrate sulfuric acid. Likewise, the use of $HF\text{-}BF_3$ for meta-xylene recovery requires the handling of corrosive gases and expensive special alloys for operating plant equipment.

Clathration techniques, on the other hand, require the mechanical handling of approximately 8 to 10 times the mass of extraneous materials relative to the component to be separated, and thus, is highly expensive on the basis of energy requirements alone. Finally, even adsorption techniques in which one isomer component is adsorbed on a solid adsorbent, require large initial investments in adsorbents that can be readily inactivated by contaminants contained in the isomer feedstock.

As a consequence of the disadvantages inherent in the prior art separation processes, a considerable need has developed for a less complex, relatively inexpensive, but highly effective process for separating meta-xylene from its isomers: (1) that is compatible with existing para-xylene recovery facilities and (2) that can take full advantage of existing refrigeration capacity already expended to cool process liquids to low temperatures.

Summary of the Invention

It has now been found that meta-xylene of improved purity can be selectively and preferentially separated from mixtures of meta-xylene and other contaminating $C_8$ aromatic isomers by creating a unique set of process conditions in which the relative rates of meta- and para-xylene crystallization are such that para-xylene is crystallized at an unexpectedly low crystallization rate relative to the rate of meta-xylene crystallization. More specifically, in the process of this invention a mixture of meta-xylene and its contaminating $C_8$ aromatic isomers is first selected or prepared on the basis that the mixture contains: (1) a substantially eutectic mixture of meta- and para-xylene, e.g., meta- and para-xylene are present in substantially their eutectic ratio, (2) an adjusted concentration of ortho-xylene in the mixture at a level below the eutectic ratio of ortho- and meta-xylene, and (3) an adjusted concentration of para-xylene in the mixture of about 10 mole percent or less. The mixture containing such prepared, adjusted or selected concentrations of ortho-, and meta- and para-xylene is then cooled at a temperature and for a time sufficiently short to provide a slurry of crystals enriched in meta-xylene relative to the ratio of meta- and para-xylene normally obtained in crystallization to thermodynamic equilibrium.

Brief Description of the Drawings

The invention will be more readily understood by reference to the drawings, in which:

FIG. 1 is a diagrammatic flow sheet of one embodiment of the process of this invention in which external diluent is added to the xylene mixtures to adjust the concentration of para-xylene; and FIG. 2 is a diagrammatic flow sheet of another embodiment of the process of this invention in which the concentration of para-xylene is adjusted by means of a two-stage crystallization.

Description of Embodiments

By the process of this invention, meta-xylene can be selectively separated from mixtures of $C_8$ isomers containing meta-xylene, para-xylene, ethylbenzene and ortho-xylene. Quite unexpectedly, by the practice of this invention, mixtures of crystals enriched in meta-xylene can be selectively and preferentially crystallized from para-xylene containing solutions. Under the unique process conditions defined by this invention, para-xylene is selectively crystallized at an unexpectedly low rate relative to the rate at which meta-xylene is crystallized. Thus, enrichment of the meta-xylene occurs in a kinetically controlled process in which meta- and para-xylene crystallize at relative crystallization rates which differ.

The selection, or if desired, the preparation of a feed stream of $C_8$ isomers is made on the following basis. First, the mixture of $C_8$ isomers desirably has meta- and para-xylene present in substantially their eutectic ratio. Since the eutectic ratio of meta- and para-xylene varies as the total concentration of para- and meta-xylene in the $C_8$ mixture varies, the exact eutectic ratio employed will vary slightly. For example, in a binary mixture containing only para- and meta-xylene, the eutectic ratio is about 87 to 13 meta- to para-xylene. In the case of a $C_8$ isomer mixture having only a combined meta- and para-xylene concentration of about 25 percent, the eutectic ratio is about 91 to 9 metal to para-xylene. Naturally, since typical reject filtrate streams obtained from para-xylene recovery plants have $C_8$ isomer mixtures in which meta- and para-xylene are contained in substantially their eutectic ratio, such reject filtrate streams are very desirable starting materials for use in the practice of this invention.

After selecting or preparing a mixture of $C_8$ isomers having meta- and para-xylene in substantially their eutectic ratio the concentration of ortho-xylene contained in the mixture is adjusted to a level below the eutectic ratio of ortho- and meta-xylene. Preferably, the concentration of ortho-xylene contained in the mixture of $C_8$ isomers is reduced to a level below the eutectic ratio of ortho- and meta-xylene before any crystallization or removal of para-xylene takes place. In the case of a typical reject filtrate stream this normally requires the reduction of ortho-xylene in the mixture to about 11 mole percent or less.

Finally, the concentration of para-xylene contained in the mixture is adjusted to about 10 mole percent or less and preferably 8 mole percent or less. It should be understood, of course, that the lower the para-xylene concentration below 10 mole percent, the greater the difference becomes between the relative crystallization rates of meta- and para-xylene. The effect of para-xylene concentration on para-xylene crystallization rate is illustrated in the following table in which the rate constants are shown for crystallization of para-xylene at various concentration levels.

TABLE 1
[Rate constants for crystallization]

| Run temp. (° C.) | dc/dt=kΔS [1] Initial [PX] [3] (moles percent) | k [2] |
|---|---|---|
| −59.2 | 12.7 | 66.4×10⁻⁴ |
| −67.0 | 9.6 | 21.6×10⁻⁴ |
| −72.4 | 7.2 | 5.1×10⁻⁴ |

[1] S = supersaturation = [PX] initial − [PX] solubility.
[2] In units of min.⁻¹.
[3] [PX] = para-xylene concentration.

Adjustment of the para-xylene concentration can be accomplished in a number of ways. One very desirable technique involves the addition of a diluent to the $C_8$ mixture until the concentration of the para-xylene component is reduced to about 10 mole percent or less. The most desirable diluents are low melting solvents, such as toluene, butane, propane and the like, which are also capable of being easily separated from $C_8$ isomers by distillation. $C_8$ naphthenes obtained as a by-product of isomerization are also desirable diluents useful in the practice of this invention.

Another useful technique for adjusting the concentration of para-xylene requires that the initial $C_8$ mixture be subjected to a series of successive crystallizations. The first of such crystallizations is designed to remove para-xylene until the meta-xylene-para-xylene eutectic is reached. Then the mother liquor from the first crystallization is further crystallized to remove crystals at the para-, meta-xylene eutectic, roughly 88 percent meta-xylene and 12 percent para-xylene, and at the same time produce a mother liquor having a concentration of about 10 mole percent or less para-xylene.

In either event, the $C_8$ mixture will have adjusted para-xylene concentrations of no greater than about 10 mole percent and preferably concentrations below 8 mole percent. It has been determined that even higher purity meta-xylene can be recovered as the concentration of para-xylene in the $C_8$ mixture is further reduced, for example, to 7 mole percent or less. For example, 90 percent or greater meta-xylene purity has been accomplished at adjusted para-xylene concentrations of 8 mole percent, in contrast with 97 percent meta-xylene purity at adjusted para-xylene concentrations of 7 mole percent.

It should be noted, of course, that the proper selection of a starting mixture, e.g., containing meta- and para-xylene in substantially their eutectic ratio, can avoid the necessity of initially adjusting the meta- and para-xylene concentrations to achieve this desired ratio. Thus, for example, by selecting a reject filtrate stream of $C_8$ isomers, no initial crystallization is required to obtain a $C_8$ mixture having meta- and para-xylene in substantially the proper ratio.

It should also be noted that the removal of ortho-xylene, if required, is desirably carried out before any para-xylene cyrstallization takes place in a para-xylene recovery plant. For example, ortho-xylene is preferably removed from the initial reformate stream feed to a para-xylene plant. Thus, when a reject filtrate stream from a para-xylene plant is to be used for the process of this invention, ortho-xylene should preferably be first removed from the feedstock to the para-xylene plant by fractiontion prior to any crystallization or cooling.

After preparing or selecting an appropriate $C_8$ mixture for use in the practice of this invention and adjusting the concentrations of ortho- and para-xylene to the desired levels, the mixture is cooled in a crystallizer at a temperature and for a time sufficiently short to provide a slurry of crystals enriched in meta-xylene relative to the ratio of meta- and para-xylene normally obtained in solids crystallized to thermodynamic equilibrium. In practical terms, this means cooling the treated $C_8$ mixture for about 5 to 150 minutes and preferably 5 to 40 minutes to provide a nonequilibrium slurry of crystals and liquors equivalent to about 10 to 90 percent by weight of the amount of crystal solids normally obtained in crystallization to thermodynamic equilibrium.

Surprisingly, during this cooling step, the para-xylene contained in the cooled mixture crystallizes, but at a rate sufficiently slow relative to the rate of meta-xylene crystallization, to permit the recovery of a meta-xylene concentrate enriched relative to the ratio of meta- and para-xylene normally obtained in crystallizaiton to thermodynamic equilibrium.

Selective crystallization of the meta-xylene is promoted by seeding with meta-xylene crystals, by reducing residence time in the crystallizer and by maintaining small temperature differences between the $C_8$ solution and the coolant. These conditions can desirably be accomplished by using an internal refrigerant, such as carbon dioxide, ethane, ethylene or the like, which is introduced physically into the $C_8$ mixture. By careful selection of the internal refrigerant, the refrigerant may also serve as a diluent to adjust the para-xylene concentration to its desired level.

A desired rate of meta-xylene crystallization is achieved, for example, at temperatures in the range of about −65° to −90° C. Seeding of the $C_8$ solution, although not required to form high purity meta-xylene crystals, nonetheless promotes the rate of meta-xylene crystallization. It has been observed that the use of between about 0.1 and 2.0 percent by weight meta-xylene seeds of uniform size increases the rate of meta-xylene crystallization to a desired level.

Likewise, crystallizer residence times are usually controlled for a time sufficient to provide a slurry of crystals and liquor having about 10 to 90 percent by weight of the crystal solids expected under equilibrium conditions. It should be understood, however, that higher or lower temperatures may be required to adjust the total solids and crystal content to desired levels. Typically, short crystallizer residence times in the range of about 5 to 150 minutes and preferably 5 to 40 minutes at temperatures of about −65 to −90° C. are required to obtain the desired enriched meta-xylene concentrations. Shorter crystallizer residence times, for example, result in lower amounts of solids after cooling, but these solids are more concentrated in meta-xylene.

The crystallization process can be operated either batchwise or continuously. The crystallizers can be designed as stirred tanks or preferably as plug flow vessels. Recirculation of product slurry to provide meta-xylene seed crystals is especially desirable when plug flow vessels are used in the crystallization process. In the case of stirred tank crystallizers, the recirculation of product slurry is not required.

Finally, if a jacketed crystallizer is used to provide cooling in the practice of this invention rather than internal refrigerants, the temperature difference between the $C_8$ aromatic solution and the crystallizer wall is desirably maintained in the range of about 1 to 10° C. On the other hand, if an internal refrigerant is used, the desired small temperature difference between the coolant and $C_8$ mixture is inherently accomplished.

Removal of the high purity meta-xylene rich crystals, prepared by the process of this invention, from the mother liquor remaining after crystallization can be accomplished by any of a number of mechanical techniques, including filtering, centrifuging and the like. Moreover, the recovered meta-xylene crystals can be further concentrated by partial melting or through another crystallization if desired, to produce even higher purity meta-xylene, while the mother liquor obtained from the partial melting or recrystallization can be fractionated to remove diluent or recycled for isomerization and retreatment.

The meta-xylene containing $C_8$ mixture prior to treatment for ortho-xylene removal and prior to treatment for adjusting the para-xylene concentration in accordance with the process of this invention is a mixture of about 45 mole percent meta-xylene and about 20 mole percent para-xylene, about 15 mole percent ethylbenzene, and about 20 mole percent ortho-xylene. This mixture can be provided by any of a number of conventional means. Under typical para-xylene plant operating conditions a residue or reject filtrate obtained from crystallization and recovery of para-xylene from a $C_8$ reformate is provided containing about 8 to 20 mole percent ethylbenzene, about 8 to 13 mole percent para-xylene, and about 15 to 25 mole percent ortho-xylene, with the remaining portion being meta-xylene. Preferably, sufficient ortho-xylene will have been removed by fractionation prior to para-xylene crystallization to leave only 11 mole percent or less ortho-xylene remaining in the mixture. At this point the ortho-xylene concentration should be sufficiently small to permit meta-xylene to be crystallized without first reaching the ortho-xylene eutectic. Then the concentration of para-xylene is adjusted to the 8 mole percent or lower level desired in the practice of this invention.

In practice, the process of this invention can be embodied in a variety of process flow arrangements. Two such arrangements are illustrated in FIGS. 1 and 2. Referring first to the embodiment illustrated in FIG. 1, for example, it can be seen that a typical mixture of $C_8$ isomers under para-xylene plant operating conditions (15 mole percent ethylbenzene, 20 mole percent para-xylene, 45 percent mole meta-xylene and 20 mole percent ortho-xylene) enters column 11 via line 31 and is fractionated to remove about one half of the ortho-xylene. The overhead stream from column 11 then enters a first crystallizer 12 via line 32 and is cooled to a temperature of about −65° C. to recover para-xylene in excess of the eutectic concentration. With 10 moles of ortho-xylene removed by fractionation, 90 moles of $C_8$ mixture enter crystallizer 12 via line 32. This crystallizer inlet composition is 16.7 mole percent ethylbenzene, 22.2 mole percent para-xylene, 50.0 mole percent meta-xylene and 11.1 mole percent ortho-xylene. In this first stage crystallization, 14 moles of para-xylene crystals are removed at the first stage centrifuge 13 and 76 moles of mother liquor leave via line 33 for the second stage crystallization. The mother liquor has a composition 19.3 mole percent ethylbenzene, 9.7 mole percent para-xylene, 58.0 mole percent meta-xylene and 13.0 mole percent ortho-xylene.

As mentioned previously, the mother liquor from this first stage crystallization is diluted with a low melting solvent to reduce the para-xylene content of the $C_8$ mixture. At this stage, prior to cooling in crystallizer 14, the $C_8$ mixture has a composition of 16.8 mole percent ethylbenzene, 6.75 mole percent para-xylene, 50.6 mole percent meta-xylene, 11.3 mole percent ortho-xylene and 14.6 mole percent diluent. This diluted mother liquor enters crystallizer 14 via line 34 and is then cooled at a temperature of −74.7° C. for a time sufficient to produce the desired amount of solids enriched to the desired meta-xylene concentration. The meta-xylene rich crystals are then removed by centrifuge 15 and the mother liquor distilled in column 16 to recover diluent. Finally, the remaining mixture of $C_8$ isomers is recycled through isomerizer 17 to fractionation column 11.

The embodiment of this invention illustrated in FIG. 1 can be carried out at other conditions as illustrated in the following example:

EXAMPLE 1

100 moles (15% EB, 20% PX, 45% MX, 20% OX) distillation, yield=20 moles ortho-xylene
80 moles (18.8 EB, 25.0 PX, 56.2 MX) crystallization, −62.3° C. yield=14 moles para-xylene
66 moles (22.7 EB, 9.1 PX, 68.2 MX) dilution add 23 moles diluent at −62° C.
89 moles (16.8 EB, 6.75 PX, 50.6 MX, 25.9 diluent) crystallization, −74.7° C. yield=10 moles of a 95% meta-xylene concentrate
79 moles (19.0 EB, 6.96 PX, 45.0 MX, 29.2 diluent) distillation, yield=23 moles diluent
56 moles (26.8 EB, 9.8 PX, 63.4 MX)

Totals: 100 parts feed+isomerate yield:

14 parts para-xylene
20 parts ortho-xylene
10 parts meta-xylene 10 parts 95/5 mixed meta-xylene/para-xylene Referring to the embodiment of this invention illustrated in FIG. 2, it can be seen that a two stage crystallization is employed to adjust para-xylene concentrations instead of the diluent addition technique illustrated in FIG. 1. In this embodiment, mixed C$_8$ isomerate from isomerizer 21 enters fractionation column 22 via line 40. Excess ortho-xylene is removed in column 22 until the orthoxylene concentration in the overhead stream line 41 is reduced to 10 mole percent or less.

This overhead stream is directed to first stage crystallizer 23 via line 41 to crystallize para-xylene until the meta-xylene eutectic is reached. The mother liquor leaving centrifuge 24 from this first stage crystallization via line 42 is then used as a feedstock for the second stage crystallization in crystallizer 25. There a mixture of C$_8$ isomers is crystallized and crystals having a composition approaching the para-, meta-xylene eutectic, e.g., 12 percent para-xylene and 88 percent meta-xylene, are removed through centrifuge 26 via line 43. The mother liquor leaving centrifuge 26 via line 44 has an adjusted para-xylene concentration of 10 mole percent or less. The mother liquor then enters the third stage crystallizer 27 via line 44 where it is cooled to a temperature and for a time sufficient to produce the desired amount of solids enriched to the desired meta-xylene concentration. Unexpectedly, the paraxylene crystallizes at a rate much slower than that of meta-xylene, and meta-xylene rich crystals are removed by centrifuge 28 via line 45. Mother liquor from this third stage crystallization leaves centrifuge 28 via line 46 and is then fractionated in column 29 to remove ethylbenzene and then recycled either through isomerizer 21 or directly to fractionation column 22.

The embodiment of the invention illustrated in FIG. 2 also can be conducted under a variety of conditions as illustrated by the following two examples:

EXAMPLE 2

100 parts (15% EB, 20% PX, 45% MX, 20% OX) distill yield=17.5 parts ortho-xylene
82.5 parts (18.2 EB, 24.2 PX, 54.6 MX, 3.0 OX) crystallize —62.4° C., yield=13.8 parts para-xylene
68.7 parts (21.86 EB, 8.94 PX, 65.59 MX, 3.60 OX) crystallize —68.9° C., yield=24.5 parts (88.5% MX). (12.5% PX)
44.2 parts (33.95 EB, 6.98 PX, 53.46 MX, 5.59 OX) crystallize, —77.0° C., yield=9.4 parts of a 95.8% meta-xylene concentrate
34.8 parts (43.1 EB, 7.74 PX, 42.0 MX, 7.10 OX) distill yield=13.2 parts ethylbenzene
21.6 parts (8.5 EB, 12.44 PX, 67.7 MX, 11.4 OX)

Total 100 parts feed+isomeric yield:
   17.5 parts ortho-xylene
   13.8 parts para-xylene
   13.2 parts ethylbenzene
   9.4 parts 95.8/4.2 mixed meta-xylene/para-xylene
   24.5 parts 87.5/12.5 mixed meta-xylene/para-xylene

EXAMPLE 3

100 parts (15% EB, 20% PX, 45% MX, 20% OX) distill yield=11.5 ortho-xylene
88.5 parts (17.0 EB, 22.6 PX, 50.8 MX, 9.6 OX) crystallize —65.0° C., yield=14 parts para-xylene
74.5 parts (20.18 EB, 8.10 PX, 60.32 MX, 11.40 OX) crystallize —68.9° C., yield=15 parts (88.5% MX) (12.5% PX)
59.5 parts (25.28 EB, 6.98 PX, 53.46 MX, 14.28 OX) crystallize —76.7° C., yield=12.2 parts of a 95.1% meta-xylene concentrate
47.3 parts (31.85 EB, 7.50 PX, 42.7 MX, 18.0 OX) distill yield=17.2 parts ethylbenzene
30.1 parts (8.5 EB, 11.8 PX, 67.2 MX, 28.30 OX)

Total 100 parts feed+isomeric yield:
   11.5 parts ortho-xylene
   14.0 parts para-xylene
   12.2 parts 95.4/4.9 mixed meta-xylene/para-xylene
   17.2 parts ethylbenzene
   15.0 parts 87.5/12/5 mixed meta-xylene/para-xylene The processes illustrated in FIGS. 1 and 2 are dependent upon kinetic enrichment of solids in meta-xylene during crystallization. Thus, by reason of the unique set of process conditions employed in the practice of this invention para-xylene is crystallized at an unexpectedly low crystallization rate relative to the rate of meta-xylene crystallization. As mentioned previously, short crystallizer residence times in the range of about 5 to 150 minutes and preferably 5 to 40 minutes at temperatures of —65 to —90° C. accomplish the desired enrichment of meta-xylene.

The effect of residence time: (1) on the amount of solids produced by the processes of this invention relative to the amount expected at equilibrium and (2) on the kinetic enrichment of these solids in meta-xylene is illustrated in the following examples which also contain data showing the effect that para-xylene content in the crystallizer feed has on kinetic enrichment.

EXAMPLE 4

Crystallization tests were made in a 12-gallon scraped-wall, stainless steel, pilot plant crystallizer modeled after commercial vessels used for para-xylene crystallization. The crystallizer was operated at the conditions given in Table II. Samples of filtrate were withdrawn through a filter probe. The amount and composition of solids were calculated indirectly from the difference between feed and filtrate analyses determined by gas chromatography. Solids expected at equilibrium were calculated by using meta-xylene and para-xylene solubility data at the actual operating temperature. As shown in Table II, crystal solids were enriched in meta-xylene above the composition expected at equilibrium. Generally the solids were enriched more at shorter residence time. Also, at constant residence time greater enrichment was obtained from feed of lower para-xylene content.

TABLE II

[Kinetic crystallization during continuous operation at short residence time]

| Feedstock | | Residence time, minutes | ΔT slurry-coolant, ° F. | Crystallization temperature, ° F. | Crystal solids | | | | Enrichment above equilibrium Δ percent meta-xylene |
|---|---|---|---|---|---|---|---|---|---|
| | | | | | | Actual amount | | | |
| Percent PX | PX/MX | | | | As percent of feed | As percent at equilibrium | Actual | Percent MX expected at equilibrium | |
| 9.2 | 13.7/86.3 | 21 | 21 | —92.5 | 10.9 | 62 | 83.5 | 79.6 | 3.9 |
| 9.2 | 13.7/86.3 | 27 | 26 | —93.8 | 13.6 | 67 | 87.5 | 80.5 | 6.8 |
| 8.8 | 12.9/87.1 | 120 | 15 | —93.8 | 20.0 | 84 | 85.9 | 84.4 | 1.5 |
| 7.3 | 12.5/87.5 | 120 | 16 | —103.8 | 15.6 | 81 | 87.4 | 84.7 | 2.7 |

NOTE.—PX = para-xylene; MX = meta-xylene.

EXAMPLE 5

The same pilot plant crystallization described in Example 4 was operated in a somewhat different manner in order to obtain greater kinetic enrichment. During continuous flow through the crystallizer, meta-xylene seed crystals were added in order to induce nucleation. Filter probe samples were taken a few minutes after start of nucleation and the amount and composition of solids were calculated and compared to the amount and composition to be expected at equilibrium. The data in Table III show that very high enrichment was obtained a few minutes after the start of nucleation.

TABLE III

[Kinetic crystallization after nucleation during continuous operation]

| Feedstock | | Time after start of nucleation, minutes | Crystallization temperature, °F. | Crystal Solids | | | Percent MX expected at equilibrium | Enrichment above equilibrium Δ percent MX |
|---|---|---|---|---|---|---|---|---|
| | | | | Actual amount | | | | |
| Percent PX | PX/MX | | | As percent of feed | As percent of amount expected at equilibrium | Actual | | |
| 9.2 | 13.7/87.3 | 6 | −93.0 | 9.2 | 49 | 88.9 | 81.1 | 7.8 |
| 9.2 | 13.7/87.3 | 15 | −90.9 | 10.9 | 80 | 88.8 | 77.3 | 11.5 |
| 9.2 | 12.9/87.1 | 45 | −94.3 | 19.7 | 79 | 86.8 | 84.6 | 2.2 |
| 8.8 | 12.5/87.5 | 14 | −100.3 | 9.6 | 71 | 93.9 | 83.3 | 10.6 |
| 7.3 | 12.5/87.5 | 21 | −101.0 | 9.6 | 65 | 91.8 | 83.7 | 8.1 |

NOTE.—PX=para-xylene; MX=meta-xylene.

EXAMPLE 6

A batch crystallization was conducted in a glass scraped-wall jacketed crystallizer in the laboratory. After adding 330 gm. of a feed mixture comprising C₈ aromatic isomers the crystallizer was chilled to −72.5° C. Then several grams each of meta-xylene and para-xylene crystals were added in order to induce nucleation. About thirty minutes later the slurry was charged to a centrifugal filter and 9.0 grams of crude solids wet with mother liquor were recovered. The actual crystal mixture contained 97.1% meta-xylene, 2.9% para-xylene, compared to only 81.0% meta-xylene expected in solids formed at equilibrium at the same temperature. The data are summarized in Table IV.

TABLE IV

Kinetic Crystallization in Batch Operaton at Small Cooling Gradient

Feed

| | |
|---|---|
| Percent PX | 7.2 |
| PX/MX | 12.4/87.6 |
| °C. Slurry temperature minus coolant temperature, °C. | 1 |
| Crystallization temprature, °C. | −72.5 |

Crystal Solids

| | |
|---|---|
| Actual amount | |
| As percent of feed | 2.7 |
| As percent of amount expected at equilibrium | 29 |
| Actual | 97.1 |
| Percent MX expected at equilibrium | 81.0 |
| Enrichment above equilibrium Δ% MX | 16.1 |

It should be understood that various modifications can be made to the embodiments discussed herein without departing from the spirit and scope of the invntion as defined in the appended claims.

We claim:

1. A process for selectively and preferentially separating meta-xylene from a mixture of C₈ aromatic isomers under kinetically controlled conditions which comprises:
   selecting a mixture of meta-xylene and C₈ aromatic isomers containing a substantially eutectic mixture of meta-xylene and para-xylene;
   adjusting the concentration of ortho-xylene in the mixture to a level below the eutectic ratio of ortho-xylene and meta-xylene;
   adjusting the concentration of para-xylene in the mixture to 10 mole percent or less while maintaining the ratio of para-xylene to meta-xylene at or greater than the eutectic ratio of para-xylene to meta-xylene; and
   cooling the mixture at a temperature in the range of about −65 to −90° C. for a time in the range of about 5 to 150 minutes to provide a slurry of crystals and liquor under non-equilibrium conditions, whereby the crystals are enriched in meta-xylene relative to the ratio of meta-xylene and para-xylene obtained at crystallization to thermodynamic equilibrium.

2. The process of Claim 1 wherein the fraction of the contained para-xylene crystallized per unit time is substantially less than the fraction of contained meta-xylene crystallized per unit time.

3. The process of Claim 1 wherein the mixture of C₈ aromatic isomers prior to adjusting the concentration of para-xylene and ortho-xylene in the mixture is about 15 mole percent ethylbenzene, about 20 mole percent ortho-xylene, about 20 mole percent para-xylene, and about 45 mole percent meta-xylene.

4. The process of Claim 3 wherein the concentration of para-xylene in the mixture of C₈ aromatic isomers is adjusted by adding an amount of diluent to said mixture sufficient to reduce the concentration of para-xylene therein to about 10 mole percent or less, and preferably less than 8 percent.

5. The process of Claim 4 wherein the diluent is a low melting solvent capable of being readily separated from C₈ isomers by distillation.

6. The process of Claim 4 wherein said diluent is selected from the group consisting of toluene, butane, propane and C₈ naphthenes.

7. The process of Claim 6 wherein about 0.1 to 2.0 percent by weight meta-xylene seed crystals are added to said mixture of C₈ isomers during cooling.

8. The process of Claim 1 wherein the residence time during which said C₈ isomers are cooled is about 5 to 40 minutes at temperatures of about −65 to −90° C.

9. The process of Claim 1 wherein the concentration of para-xylene in the mixture of C₈ isomers is adjusted to a level of about 10 mole percent or less, and preferably less than 8 percent, by subjecting the mixture to a series of successive crystallizations.

10. The process of Claim 1 wherein an internal refrigerant is introduced into said mixture of C₈ isomers.

11. The process of Claim 10 wherein said internal refrigerant serves as a diluent for said mixture of C₈ isomers to reduce the concentration of para-xylene to a level of 10 mole percent or less, and preferably less than 8 percent.

12. The process of Claim 10 wherein said internal refrigerant is selected from the group consisting of carbon dioxide, ethane or ethylene.

13. The process of Claim 1 wherein the slurry of crystals enriched in meta-xylene is removed from the mother liquor remaining after crystallization.

14. The process of Claim 13 wherein the slurry of crystals enriched in meta-xylene is removed by filtering or centrifuging.

15. The process of Claim 13 wherein the recovered crystals enriched in meta-xylene are further concentrated by means of partial melting or recrystallization.

16. A process for selectively and preferentially enriching mixtures of $C_8$ aromatic isomers in meta-xylene by controlling the relative rates of crystallization for meta-xylene and para-xylene, so that para-xylene crystallizes at a low rate relative to the rate at which meta-xylene crystallizes, comprising:
selecting a mixture of $C_8$ aromatic isomers in which:
(a) meta-xylene and para-xylene are present in substantially their eutectic ratio and (b) ortho-xylene is present at a level below the eutectic ratio of ortho-xylene and meta-xylene;
adjusting the concentration of para-xylene in the mixture to about 10 mole percent or less, and preferably less than 8 percent while maintaining the ratio of para-xylene to meta-xylene at or greater than the eutectic ratio of para-xylene to meta-xylene;
cooling the mixture under non-equilibrium conditions at a temperature in the range of about −65 to −90° C. for a time in the range of about 5 to 150 minutes to provide a slurry of crystals enriched in meta-xylene relative to the ratio of meta-xylene and para-xylene obtained in crystallization to thermodynamic equilibrium; and
removing the slurry of enriched crystals from mother liquor remaining after the crystallization.

17. The process of Claim 16 wherein the slurry of enriched crystals removed from said mother liquor is further enriched in meta-xylene concentration by partial melting or recrystallization.

18. The process of Claim 16 wherein:
the concentration of para-xylene in the mixture of $C_8$ aromatic isomers is adjusted by adding an amount of diluent to said mixture sufficient to reduce the concentration of para-xylene therein to about 10 mole percent or less, and preferably less than 8 percent.

19. The process of Claim 18 wherein said diluent is an internal refrigerant for said mixture.

20. The process of Claim 18 wherein said diluent is a low melting solvent capable of being readily separated from $C_8$ isomers by distillation.

21. The process of Claim 16 wherein the concentration of para-xylene in the mixture of $C_8$ aromatic isomers is adjusted by subjecting said mixture to a series of one or more successive crystallizations.

22. The process of Claim 16 wherein the selected mixture of $C_8$ aromatic isomers is prepared by adjusting the concentration of ortho-xylene contained in a reject filtrate comprising about 8 to 20 mole percent ethylbenzene, about 8 to 13 mole percent para-xylene, about 15 to 25 mole percent ortho-xylene, with the remaining portion being meta-xylene, to about 11 mole percent or less ortho-xylene.

References Cited
UNITED STATES PATENTS

| | | | |
|---|---|---|---|
| 2,530,978 | 11/1950 | Mason | 260—674 |
| 2,622,115 | 12/1952 | Carney | 260—674 |
| 2,777,888 | 1/1957 | Hoff et al. | 260—674 |
| 2,884,470 | 4/1959 | Harrison et al. | 260—674 |
| 2,435,792 | 2/1948 | McArdle et al. | 260—674 |
| 3,277,200 | 10/1966 | Smith et al. | 260—674 |

DELBERT E. GANTZ, Primary Examiner

C. E. SPRESSER, Jr., Assistant Examiner

U.S. Cl. X.R.

62—58; 260—668 A, 707

UNITED STATES PATENT OFFICE
CERTIFICATE OF CORRECTION

Patent No. 3,825,614      Dated July 23, 1974

Inventor(s) Alan G. Bemis, John K. Darin, and Melvern C. Hoff

It is certified that error appears in the above-identified patent and that said Letters Patent are hereby corrected as shown below:

Column 1 - line 44 - reads "recently" - word should be "recent"

Column 7 - line 54 - reads "isomeric" - word should be "isomerate"

Column 8 - line 16 in Example 3 - the word "isomeric" should be "isomerate"

Table II - at bottom of columns 7 & 8 under heading Slurry Coolant 3rd figure down reads 15 - it should read - 16.

Table II - at bottom of columns 7 & 8 under heading Percent MX expected at equilibrium - 2nd figure down reads 80.5 should read - 80.7

Signed and sealed this 8th day of April 1975.

(SEAL)
Attest:

RUTH C. MASON
Attesting Officer

C. MARSHALL DANN
Commissioner of Patents
and Trademarks